(No Model.) 2 Sheets—Sheet 1.
R. RAKESTRAW.
SWINGING GATE.
No. 553,134. Patented Jan. 14, 1896.
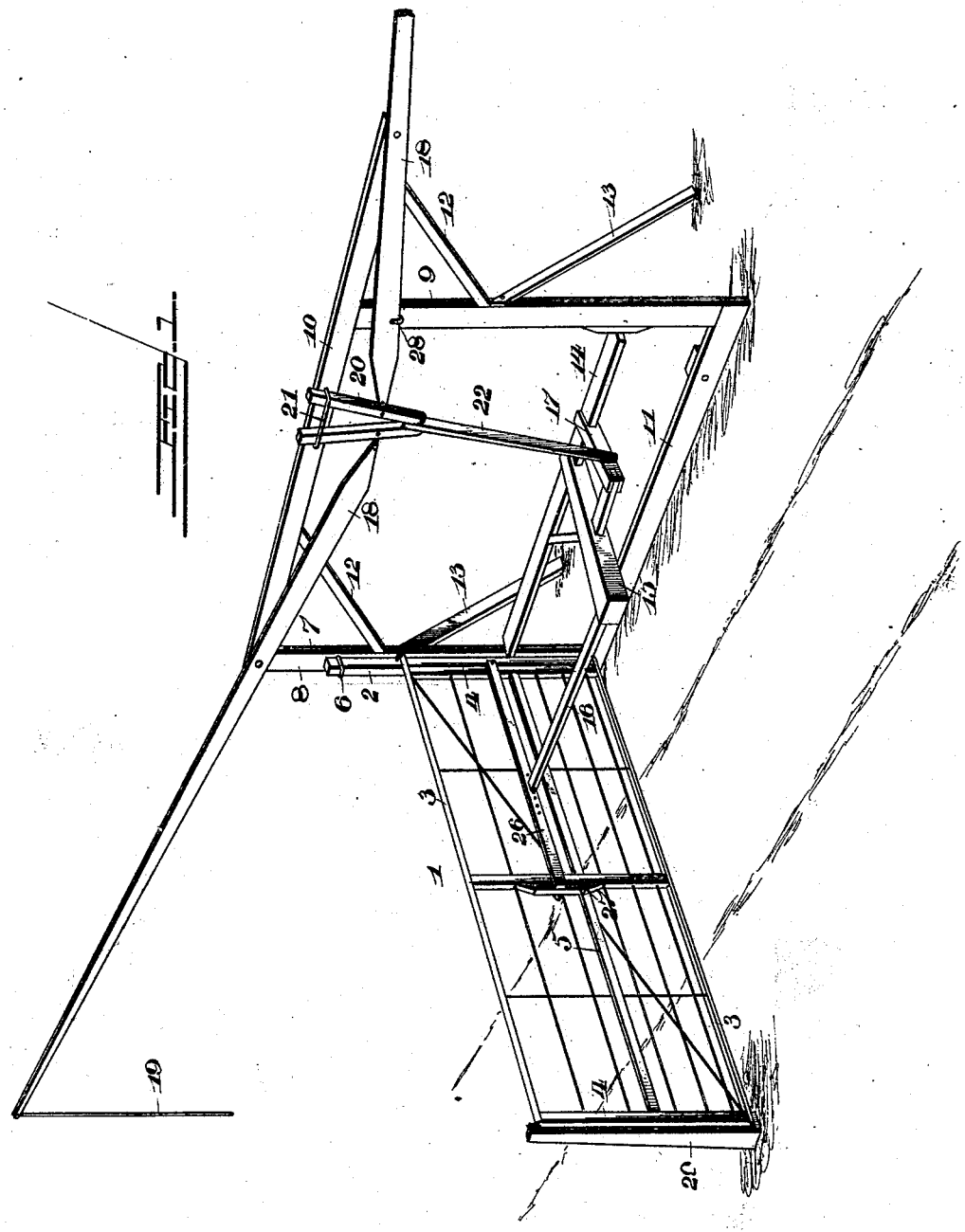
Witnesses
H. Doyle
H. F. Riley
Inventor,
Roland Rakestraw,
By his Attorneys,
C. A. Snow & Co.

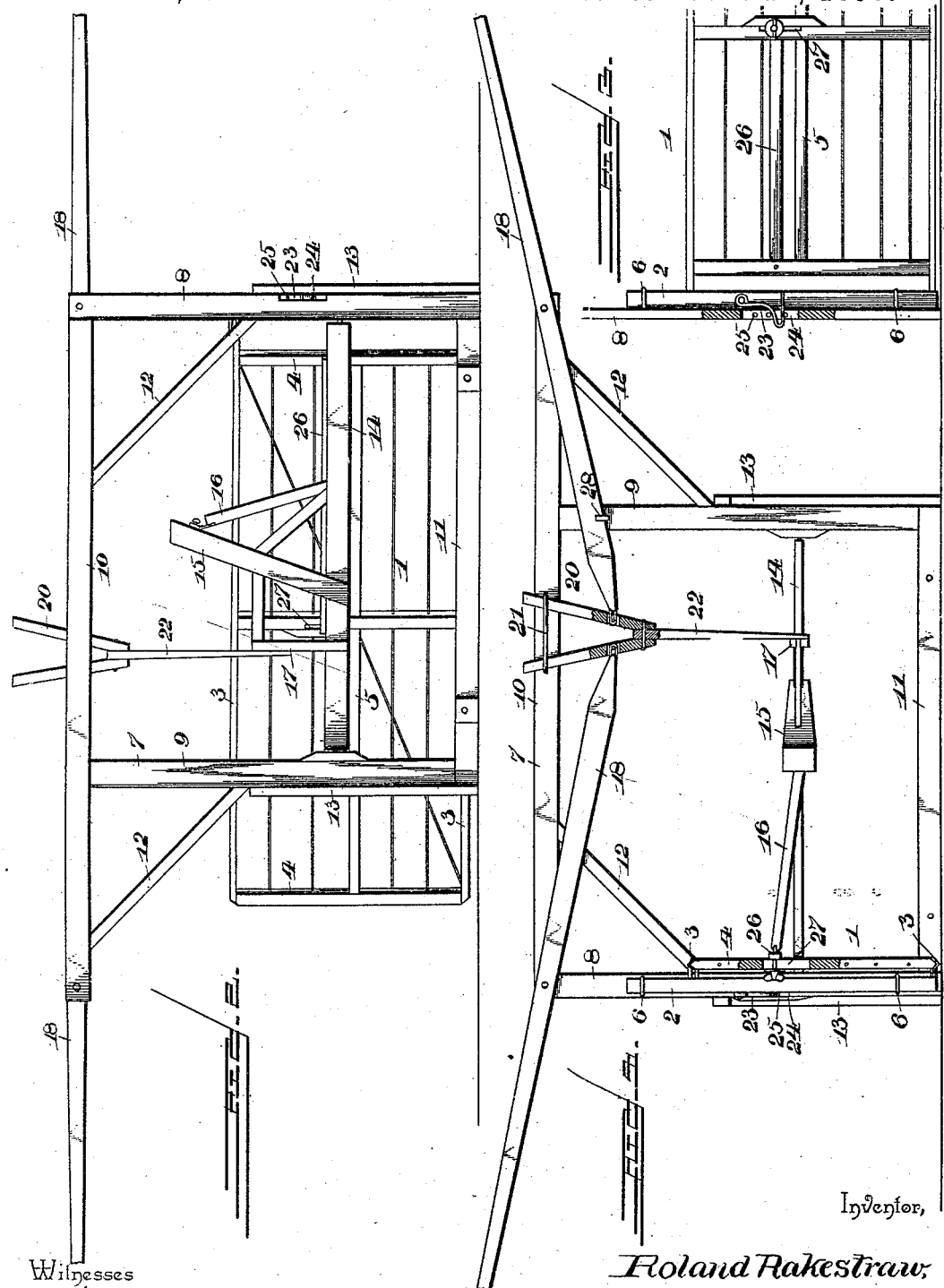

UNITED STATES PATENT OFFICE.

ROLAND RAKESTRAW, OF WYOMING, ILLINOIS, ASSIGNOR OF ONE-HALF TO PETER LANE, OF SAME PLACE.

SWINGING GATE.

SPECIFICATION forming part of Letters Patent No. 553,134, dated January 14, 1896.

Application filed July 16, 1895. Serial No. 556,172. (No model.)

*To all whom it may concern:*

Be it known that I, ROLAND RAKESTRAW, a citizen of the United States, residing at Wyoming, in the county of Stark and State of Illinois, have invented a new and useful Swinging Gate, of which the following is a specification.

The invention relates to improvements in gates.

The object of the present invention is to improve the construction of swinging gates and to provide a simple and inexpensive one which may be readily opened and closed a distance from it to avoid dismounting or leaving a vehicle.

A further object of the invention is to dispense with the ordinary latch and to provide an operating mechanism which will retain the gate in its open and closed positions.

The invention consists in the construction and novel combination and arrangement of parts hereinafter fully described, illustrated in the accompanying drawings, and pointed out in the claims hereto appended.

In the drawings, Figure 1 is a perspective view of a gate constructed in accordance with this invention and shown closed. Fig. 2 is a rear elevation of the same, the gate being partly open. Fig. 3 is a front elevation, partly in section, of the inner half of the gate. Fig. 4 is a vertical sectional view, the gate being closed.

Like numerals of reference indicate corresponding parts in all the figures of the drawings.

1 designates a swinging gate hinged to a vertically-adjustable bar 2 and constructed in any desired manner, but consisting preferably of channeled iron top and bottom horizontal bars 3, vertical bars 4, and a horizontal bracing-bar 5, together with wires arranged horizontally, vertically, and diagonally or inclined, as desired.

The vertically-adjustable bar 2 is mounted in suitable guides 6 of a supporting-frame 7, which is rectangular, being composed of vertical sides or uprights 8 and 9 and top and bottom connecting-bars 10 and 11. The top bar 10 is extended beyond the upright or post 9 and the parallelism of the frame is preserved by inclined braces 12, secured to the uprights 8 and 9 and to a top connecting-bar 10. The bottom bar 11 is secured to short posts by bolts or any other suitable fastening devices, and the frame is further supported by laterally-inclined braces 13, located at the ends of the frame.

A horizontally-disposed rock-shaft 14 is removably journaled between the uprights or vertical sides 8 and 9 of the supporting-frame, and is provided with a heavy oscillating arm 15, arranged at right angles to the rock-shaft and extending horizontally therefrom when the gate is closed and connected with the gate by a link-bar 16, and which is adapted in oscillating backward and forward to carry with it the gate to open and close the same.

The rock-shaft is provided with an arm 17, which is shorter than the heavy arm 15, and which is connected with operating-levers 18, fulcrumed on the supporting-frame and extending from opposite sides of the gate, and provided at their outer terminals with depending handles or rods 19, located within easy reach to enable the gate to be operated by a person on foot or on horseback, or in a vehicle. The inner ends of the operating-levers 18 are loosely connected with the sides of a substantially V-shaped slide 20, arranged in and depending from a guide 21 of the top bar of the supporting-frame, and having its sides pivoted to the upper end of a connecting or link bar 22, which is pivoted at its lower end to the shorter arm 17 of the rock-shaft 14. The arms of the rock-shaft are suitably supported by braces connecting the arms with each other and with the shaft.

When the outer ends of the operating-levers are drawn downward, the V-shaped slide is raised, swinging the rock-shaft, and the heavy arm 15 thereof gains sufficient momentum to carry it readily over the center or perpendicular, and to carry with it the gate. As soon as the heavy arm 15 swings past a perpendicular position, it completes the opening or closing operation of the gate, and its weight operates to hold the gate in an open or closed position, obviating the necessity of employing a latch.

The supporting-frame is adapted to be reversed to enable the gate to be hung to either side of it and to swing in either direction, and the gate is secured in its vertical adjustment by a substantially L-shaped pawl 23, pivotally mounted at one side of the bar 2, and provided at its angle with an engaging portion co-operating with a ratchet 24 of the supporting-frame. The pawl is constructed of a single piece of metal, bent to form a projecting heel at its angle, and the ratchet may be constructed in any suitable manner, but preferably consists of a vertical keeper secured to the upright 8, and provided with a series of transverse pins or fastening devices 25, forming stops and located at intervals.

In order to accommodate the operating mechanism to the adjustment of the gate vertically the link-bar 16 is secured movably to a substantially horizontally-disposed adjustable bar 26, pivoted at its rear end to the back of the gate and disposed longitudinally thereof. The front end of the adjustable bar 24 is secured to the gate by a fastening device arranged in a slot 27 of the gate, and provided with a thumb-nut engaging the gate and retaining the bar 26 in its adjustment. When the gate is raised, the bar 26 is swung downward slightly in order to preserve the proper relation of the operating mechanism and the gate.

The downward movement of the operating-levers is limited by a substantially L-shaped stop 28, mounted on the upright 9 and located below the adjacent operating-lever 18, and a latch-post 29 is located at the front end of the gate when the latter is closed, to form a stop to the same.

It will be seen that the gate is simple and comparatively inexpensive in construction, that it is positive and reliable in operation, and that it is adapted to be readily opened and closed on foot or on horseback, or from a vehicle. It will also be seen that the gate is capable of vertical adjustment, to enable it to swing clear of obstructions, and that the operating mechanism is readily adjusted to accommodate it to the adjustment of the gate.

Changes in the form, proportion, and the minor details of construction may be resorted to without departing from the principle or sacrificing any of the advantages of this invention.

What I claim is—

1. The combination of a pair of uprights, a gate hinged to one of the uprights, a horizontal rock shaft journaled on the uprights and arranged between the same and provided with a horizontally disposed weighted arm extending forward at right angles to the rock shaft, a bar connecting the weighted arm with the gate, a vertically movable slide located above the rock shaft, a bar connecting the slide with the rock shaft, and operating levers having their inner terminals loosely connected with the slide, substantially as described.

2. The combination of a supporting frame, a swinging gate, a horizontally disposed rock-shaft provided with an oscillating arm connected with the gate, a vertically movable substantially V-shaped slide mounted on the supporting frame, a connecting bar pivotally connected to the slide and to the rock-shaft, and operating levers connected with the sides of the slide, substantially as described.

3. The combination of a supporting frame, a swinging gate capable of vertical adjustment, a horizontally disposed bar pivoted at one end to the gate and having its other end adjustably secured to the same, a horizontally disposed rock-shaft located at the back of the gate and having an oscillating arm, a link bar connecting the adjustable horizontal bar of the gate with the arm of the rock-shaft, and means for oscillating the arm of the rock-shaft, substantially as described.

In testimony that I claim the foregoing as my own I have hereto affixed my signature in the presence of two witnesses.

ROLAND RAKESTRAW.

Witnesses:
. GEORGE S. RAKESTRAW,
JOHN W. WALTERS.